Figure 1:
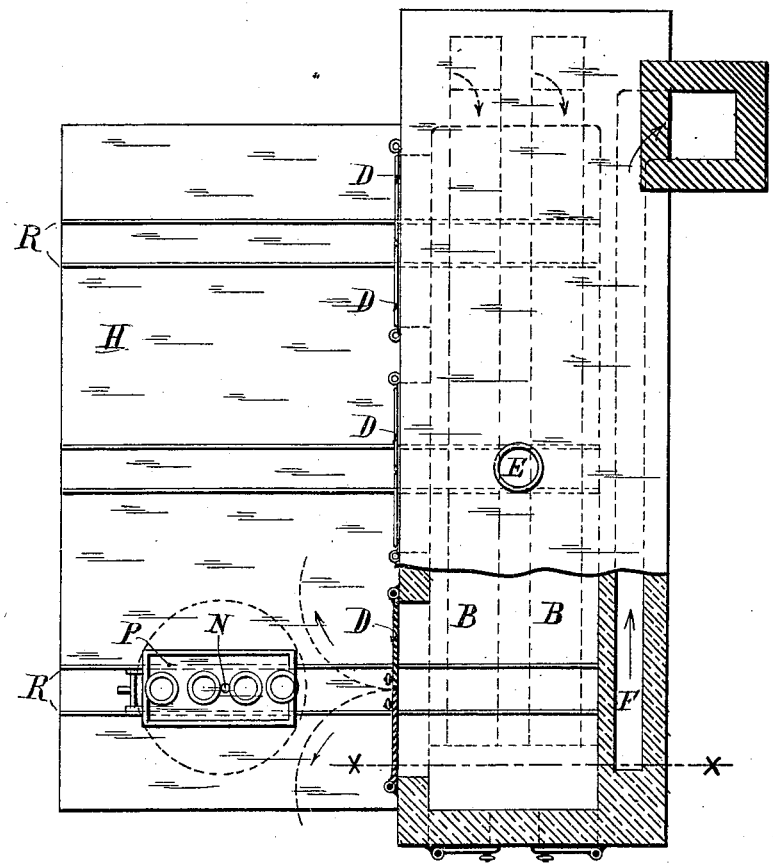

(No Model.)

W. H. HUGHES & P. O'RIELLY.
PROCESS OF PREPARING PHOSPHORIC ACID FROM BONES.

No. 258,423. Patented May 23, 1882.

WITNESSES: George A. Atwood, S. S. Lapham

INVENTOR: William H. Hughes, Philip O'Rielly, By their Atty O. Lapham

N. PETERS, Photo-Lithographer, Washington, D. C.

UNITED STATES PATENT OFFICE.

WILLIAM H. HUGHES, OF JOHNSTON, AND PHILIP O'RIELLY, OF PROVIDENCE, RHODE ISLAND.

PROCESS OF PREPARING PHOSPHORIC ACID FROM BONES.

SPECIFICATION forming part of Letters Patent No. 258,423, dated May 23, 1882.

Application filed December 15, 1881. (No model.)

*To all whom it may concern:*

Be it known that we, WILLIAM H. HUGHES, of Johnston, in the county of Providence and State of Rhode Island, and PHILIP O'RIELLY, of Providence, in said county and State, have jointly invented new and useful Improvements in the Process of Preparing Pure Acid Phosphates and Phosphoric Acid from Bones; and we do hereby declare that the following is a full, clear, and exact description of our invention, which will enable others skilled in the art to which it appertains to make and use the same.

We do not claim as new the process of treating burned or calcined bones with sulphuric acid as now used generally in lead or lead-lined vessels or vessels lined with substances liable to be corroded by the acids used or developed in the process, whereby a proportion of lead in combination or other result of corrosion is left in the resulting products to obtain acid phosphate, superphosphate of lime, or phosphoric acid; but we do claim the process for preparing phosphoric acid and acid phosphate hereinafter described, and by which such acid or phosphates are obtained free from contamination by the results of corrosion, and also free from certain organic impurities found in acid phosphates or phosphoric acid prepared from calcined bones by all other processes.

The bones are first purified and washed with warm water acidulated with about two per cent. of hydrochloric acid, and then dried. The bones are then calcined or burned, as in the present use of the art, in a suitable furnace till about a grayish or nearly white color throughout and then ground till finely pulverized. The finely-pulverized bones are then mixed with sulphuric acid and water in a vessel or tank lined with silicate of soda, or any substance not chemically acted on by the acids used or developed, in proportions, by weight, of two hundred and forty parts of pure water and seventy parts of pure commercial sulphuric acid to one hundred parts of the pulverized bones, the proportion of acid being variable according to the degree of perfection of the calcining process. If the bones are calcined to a clear white color throughout, the proportion may be as great as seventy-five parts.

The acid and water are mixed first, and the bone-powder is then added in small quantities from time to time, being stirred and mixed thoroughly till the whole mass is incorporated. The mixture is then left at rest for about twenty-four hours, after which it is put into a filter constructed of a suitable vessel lined with silicate of soda or some other substance not chemically acted on by the mixture and provided with a false bottom pierced with a series of small holes, with a clean cloth placed over these holes. On top of this cloth broken and pounded glass is placed to give an even layer about six inches in depth, and immediately over the glass is a covering of coarse cloth to prevent the clogging of the interstices of the filtering material. Above this cloth is placed the digested mass of bone-dust, acid, and water above described. To the filter may be attached a hydraulic or steam apparatus for forcing water or steam through the mass, thus quickening and rendering more complete the process. This process is a combination of leaching or lixiviation and filtering, and it tends to deliver the acidulated water in a purer state than any process heretofore used. The acid mixed with water filters into the space between the false and real bottoms of the filter, and is thence led into a reservoir constructed of suitable material lined with silicate of soda or some other substance not chemically acted on by the mixture. The liquor is then allowed to settle about ten hours, when it is drawn off into a vessel lined with some substance not acted upon chemically thereby, and a current of pure hot air or superheated steam is made to pass through it for about one and one-half hour. This aeration or steaming of the acidulated fluid drives off the sulphuret of hydrogen and various organic gaseous compounds resulting from the unburned animal matter in the bones that may remain in the fluid, and also causes a partial precipitation of the sulphate of lime before then held in the fluid. After the acidulated fluid is treated with superheated steam or hot air and allowed to cool and settle, it is filtered through cloth, after which to each gallon of the liquid having a specific gravity of 1.15 is added about four hundred and fifty grains of chlorate of potassa. The mixture is then placed in pans lined with some substance not chemically acted on by the mixture—as granite ware or agate ware—and placed in an evenly-heated furnace for the process of final evaporation and fusion.

This process of evaporation and fusion is indispensable to obtain two results—first, a complete precipitation of what sulphate of lime is left in the mixture; and, second, it destroys and carries off, as hereinafter described, all organic compounds which remain in the solution up to this point, and which, if not thoroughly broken up and eradicated, will cause a fungus growth in the phosphoric acid, and thus impair its value as an element of medicinal compounds. No one, to our knowledge, has heretofore succeeded in destroying these organic compounds. The heating of the furnace is continued till the contents of the pans are first evaporated to dryness, and afterward the heat being continued, fuse into a liquid form. At this point the oxygen leaves the potassium chlorate and destroys the organic matter contained in the pans. It is believed that the free oxygen operates by volatilization and precipitation to remove all remains of organic matter in the compound, and the chlorine passes off in the process, because none of either are to be found in the completed product, producing phosphoric acid free from organic and other impurities.

The oven and apparatus we use in this operation of evaporating and subsequently fusing the contents of the pans are formed and constructed substantially as follows, reference being had to the accompanying drawings, in which—

Figure 2:
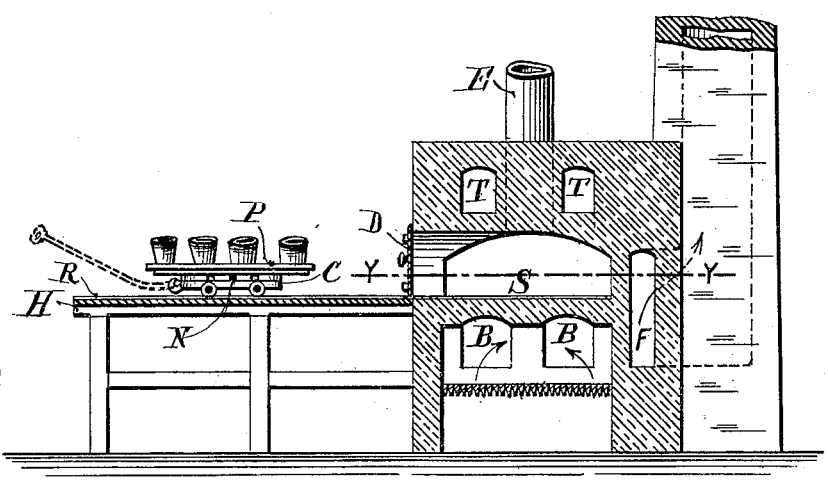

Figure 1 is a top view of the furnace and bench, with partial section through line $y\ y$ of Fig. 2. Fig. 2 is a sectional view through line $x\ x$ of Fig. 1.

Similar letters refer to similar parts in the two figures.

B B are bottom flues under the sole S of the furnace.

T T are top flues in the arch of the furnace, through which the heated gases from the fire return to the front end of the furnace, thence to be led into the side flue, F, by which they are conducted to the chimney, thus heating the oven evenly throughout. The fire is built at the end of the furnace opposite the chimney, and at the other end the flues B B are led into the flues T T.

D D D are sets of double doors, swinging open, as shown by dotted lines in sectional part of Fig. 1.

H is a bench built as high as the sole of the furnace, and across which and the sole of the furnace are laid the sets of rails R R R, constituting railroad-tracks, on each of which runs a car similar to C and consisting of a truck or car body mounted on wheels. On the truck is a platform, P, turning on a pin, N, in the center, and supported by friction wheels or rolls mounted in the top of the body of the car.

The pans containing the acid compound are placed on the platform P, and the loaded car is run into the oven between the opened doors D, after which the doors are shut and the oven heated.

E is an escape-flue, through which pass the volatile products of the evaporation and fusion of the contents of the pans.

The advantages of heating the pans and contents in such an oven instead of heating them in kettles over a fire are, first, there is no danger of burning the bottom of the pans or kettles, the furnace being heated uniformly throughout; second, there is no need of stirring the contents of the pans, they being heated uniformly on all sides; and, third, there is no danger of the boiling over of the contents of the pans, thus saving the necessity of a watchman or constant attendant, as well as the loss or waste consequent upon such boiling over.

After fusion has taken place, and the pans and contents have been sufficiently exposed to the heat of the oven, the car is drawn out by a hook or chain and unloaded. While the pans are yet hot a sufficient quantity of water is added to dissolve the acid contained in them. The fluid in the pans is then emptied into a suitable vessel lined with some substance not chemically acted on by the acid, in which it is allowed to settle and cool. It is then finally filtered through a glass percolator filled with broken and pounded glass, from which it escapes a pure solution of phosphoric acid.

It is evident that this same process can, by slight changes of ingredients, be used to make acid phosphates; or the phosphoric acid, made as described, can be united with a base to make such phosphates.

It is well known to chemists and others conversant with liquid phosphates that phosphoric acid, when extracted from bone-ash by the processes hitherto in use, contains a large quantity of organic matters in solution, which are carried into the phosphates made therefrom. These same organic matters are found in the phosphates made directly from the bone-ash. If not eradicated, this organic matter will cause a fungus and other organic growth in acid-phosphate compounds, which greatly injures the same and impairs their medicinal qualities. These organic impurities are thoroughly eradicated from the phosphoric acid and acid phosphates made by the process we have described.

It is obvious that the above-detailed process may be abbreviated by the omission of many of the comparatively less important steps and still be productive of good results. Thus the omission of steaming or aerating, and also of the cleansing of the bones before calcining, one or both, would still leave an effective process.

Having thus described and explained our invention, we claim and desire to secure by Letters Patent—

1. In the process of preparing phosphoric acid from bones, the treating calcined bones by mixing them with sulphuric acid, leaching the result, then heating the resulting products by the application of heat equally in all directions to substantial dryness and fusion and dissolving the last result, while hot, in water with successive filtrations at different stages of the process, substantially as herein described.

2. Treating liquid acid phosphates with chlorate of potassa or its equivalents, and subjecting the compound to a high degree of heat, as described, and for the purposes set forth.

3. In the process of preparing phosphoric acid from bones, the treating calcined bones by mixing them with sulphuric acid, leaching the result, treating the leached products with steam, then heating the resulting products by the application of heat equally in all directions to dryness or until fusion takes place, and dissolving the last result, while hot, in water with successive filtrations at different stages of the process, substantially as herein described.

4. The within-described process of obtaining phosphoric acid and acid phosphates from bones, consisting substantially of, first, washing the bones before calcination with water acidulated with hydrochloric acid, as described; second, calcining the bones; third, mixing the calcined bones, as described, with sulphuric acid and water; fourth, filtering the mixture, as described; fifth, the treating of the filtered result with hot air or steam; sixth, treating the result with chlorate of potassa and subjecting the same to heat, as described, in an evenly-heated furnace; seventh, the mixing the result with water and filtering the same.

WILLIAM H. HUGHES.
PHILIP O'RIELLY.

Witnesses:
OSCAR LAPHAM,
WELCOME A. GREENE.